United States Patent
Dickson et al.

(10) Patent No.: US 6,285,930 B1
(45) Date of Patent: Sep. 4, 2001

(54) TRACKING IMPROVEMENT FOR A VISION GUIDANCE SYSTEM

(75) Inventors: Monte Andre Dickson, Naperville; Bingcheng Ni, Clarendon Hills; Shufeng Han, Darien, all of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/514,475

(22) Filed: Feb. 28, 2000

(51) Int. Cl.$^7$ .................................................. G05D 1/01
(52) U.S. Cl. ........................... 701/28; 701/23; 701/50
(58) Field of Search ................................ 701/23, 28, 50, 701/24; 11/25; 172/3, 4.5, 7

(56) References Cited

U.S. PATENT DOCUMENTS

| | | | |
|---|---|---|---|
| Re. 34,080 | 9/1992 | Schmidt | 172/5 |
| 3,834,036 | 9/1974 | Scarritt, Sr. | 33/264 |
| 4,165,796 | 8/1979 | Petz | 180/401 |
| 4,211,921 | 7/1980 | Kanetou et al. | 250/202 |
| 4,298,084 | 11/1981 | Newell | 180/401 |
| 4,366,756 | 1/1983 | Brum | 104/244.1 |
| 4,505,094 | 3/1985 | Demorest | 56/10.2 F |
| 4,515,221 | 5/1985 | van der Lely | 172/3 |
| 4,528,804 | 7/1985 | Williams | 56/102 F |
| 4,640,365 | 2/1987 | Schmidt | 172/26 |
| 4,729,449 | 3/1988 | Holmquist | 180/168 |
| 4,777,785 | * 10/1988 | Rafaels | 56/10.2 A |
| 4,821,807 | 4/1989 | Trumm | 172/6 |
| 4,868,752 | 9/1989 | Fujii et al. | 701/28 |
| 4,918,441 | 4/1990 | Bohman | 2/6.2 |
| 4,967,362 | * 10/1990 | Schutten et al. | 701/50 |
| 5,040,116 | 8/1991 | Evans, Jr. et al. | 701/28 |
| 5,060,290 | 10/1991 | Kelly et al. | 382/110 |
| 5,103,924 | 4/1992 | Walker | 180/401 |
| 5,163,002 | 11/1992 | Kurami | 701/28 |
| 5,207,739 | 5/1993 | Orthman | 172/5 |
| 5,279,068 | 1/1994 | Rees et al. | 47/1.7 |
| 5,357,432 | 10/1994 | Margolis et al. | 701/23 |
| 5,367,457 | 11/1994 | Ishida | 361/328 |
| 5,410,479 | 4/1995 | Coker | 701/23 |
| 5,430,810 | 7/1995 | Saeki | 382/281 |
| 5,442,552 | 8/1995 | Slaughter et al. | 701/50 |
| 5,621,460 | 4/1997 | Hatlestad et al. | 348/265 |
| 5,661,817 | 8/1997 | Hatlestad et al. | 382/110 |

FOREIGN PATENT DOCUMENTS

| | | |
|---|---|---|
| B-39747/95 | 11/1995 | (AU) . |
| WO 96/17279 | 6/1996 | (AU) . |

OTHER PUBLICATIONS

Buffalo®, Scout ll Guidance System, Paper No. Li–Sll 99450M, Fleischer Manufacturing, Inc., Columbus, NB.
Sukup®Guidance System Slide Guide, Paper No. L1164–9205P, © 1992, Sukup Manufacturing Company, Sheffield, IA.
Row Crop Navigator®, John Day Company, ©1994 Automatic Equipment Mfg. Co., Pender, NB.
Sukup® Pivoting Guidance System Auto Guide, Paper No. L1135–9301M, ©1993, Sukup Manufacturing Company, Sheffield, IA.

* cited by examiner

*Primary Examiner*—William A. Cuchlinski, Jr.
*Assistant Examiner*—Marthe Marc-Coleman
(74) *Attorney, Agent, or Firm*—Foley & Lardner

(57) ABSTRACT

An automatic vision guidance system for an agricultural vehicle is disclosed and described. The vision guidance system uses a K-means clustering algorithm in image processing to distinguish between crop and non-crop features. The vision guidance system utilizes moment algorithms to determine the location and orientation of crop rows, from which desired wheel angles are determined and steering is commanded. The vision guidance system may adjust the location and orientation of visually determined crop rows according to a predetermined distance between crop rows. Further, the vision guidance system may utilize a redundant number of regions of interest in determining crop row locations and orientations.

17 Claims, 12 Drawing Sheets

TRACKING IMPROVEMENT FOR A VISION GUIDANCE SYSTEM

FIELD OF THE INVENTION

The present invention relates generally to systems that aid in crop cultivation. More particularly, the invention relates to an automated steering control system for a robotic cultivation system that utilizes an electronic vision guidance system.

BACKGROUND OF THE INVENTION

Guidance systems have been proposed for controlling the movement of vehicles traveling along predetermined paths such as, for example, robotic material handling guidance systems. In some applications, robotic vehicles for moving materials between separate points in a warehouse or storage area without human intervention, are provided with automated steering control systems that utilize inductive sensors mounted near the bottom of the vehicle in order to sense currents passing through thin wires disposed either at or below the surface of predetermined pathways. The inductive sensors sense the magnetic field radiated from the wire and, using conventional phase detection techniques, produce an output signal which indicates the extent to which a vehicle has drifted laterally from the desired course. The output signals from the sensors are provided to a vehicle control circuit that typically converts the sensor output signals into control error signals which are used to direct a vehicle back on course.

These inductive types of lateral guidance control systems have experienced some success in relatively slow-moving, industrial materials handling applications. However, these systems are considered to have serious drawbacks when they are contemplated for controlling motor vehicles moving at appreciable speeds on a highway or for controlling cultivating and agricultural vehicles in a farm field. For example, the magnetic field radiated by a current conducting wire disposed in the surface of the road or farm field may be distorted by metallic structures along the roadway or by stray magnetic fields from nearby power lines. Such inductive sensors are highly prone to sensing spurious signals radiated by other electromagnetic sources. In addition, such a system requires the installation and maintenance of power cables, transformers and power supplies along the road or along the farm field, which adds an appreciable cost to such a system. Furthermore, the performance of such a system is fairly limited because an inductive sensor cannot "look-ahead" as a human driver does. Inductive sensor systems can only react to the magnetic field received from the roadway or farm field immediately beneath the vehicle. Consequently, without a "look-ahead" capability, the reaction times of the inductive sensor control systems are very slow in comparison with those of a driver.

Considering lateral guidance control systems applied specifically to crop harvesting machinery or other cultivation machinery, a number of limitations are apparent. The farm field is not conducive to having current-conducting wires disposed beneath the earth's surface because cultivation may cause damage to such wires. Further, maintenance of such power cables is intractable for farmers who would find maintenance to require expensive equipment or expensive servicing. Further still, the current conducting wires are not likely to be well aligned with rows of crops in the farm field.

The task of manually steering multiple row harvesting machines, for example moving over a farm field along rows at a modest rate of speed can be a tiresome task. In harvesting equipment, the row crop separators which guide the crop to the cutting elements of the machine are often obscured by dust, crop material, and/or vegetation such that precise manual steering by visual observation is difficult if not impossible. To alleviate this problem, alternative steering control systems have been implemented which use mechanical feelers to determine the position of standing row crop relative to the row crop separators. While steering control systems with mechanical feelers offer an improvement over guidance by visual observation, or by current conducting wires, these systems inherently have certain disadvantages associated therewith. For example, the mechanical feelers are subject to fouling and damage. In addition, because of the rough and dirty environment in which the feelers must operate, they must be serviced frequently to insure that they are mechanically free. Furthermore, for spraying operations, high speeds are desirable to enable a ground vehicle to challenge the role of a crop-spraying aircraft. Because of the difficulty in controlling a crop sprayer at a high rate of speed over the farm field, the driver's task is considerably demanding or intractable and therefore an automated guidance system is desirable.

Vision guidance systems have been designed to steer a tractor relative to the rows of a crop in a farm field. However, because of the odd geometry of farm crops and the ever changing geometry of farm crops, due to growth and weed growth, the vision guidance system must be insensitive to visual noise, while also adapting to loss of growth in, for example, a barren patch of the field.

Thus, there is a need for a vision based guidance system that is insensitive to visual noise. There is also a need for a vision based guidance system for a crop cultivation system that is robust in barren patches of the field. Further, there is a need for a vision based guidance system that utilizes algorithms for rapid data processing. Further still, there is a need for a vision based guidance system for an agricultural vehicle that includes a trajectory planner capable of "looking-ahead" in the farm field. Further still, there is a need for a vision based guidance system for an agricultural vehicle that utilizes regions of interest to identify vegetation based upon a cost optimization. Even further still, here is a need for a vision based guidance system for an agricultural vehicle that utilizes predetermined distances between rows to aid in guidance of the system. Still even further, there is a need for a vision based guidance system that utilizes a multiplicity of rows for tracking.

SUMMARY OF THE INVENTION

One embodiment of the invention relates to an automatic guidance system for an agricultural vehicle. The guidance system includes an electromagnetic sensor for gathering information about field characteristics. The electromagnetic sensor is configured to provide a digital signal representative of the crop rows in an agricultural field. The digital signal is representative of pixels of an image. The guidance system also includes an information processor having a memory and a central processing unit, and the information processor coupled to the electromagnetic sensor. Further, the guidance system includes a program in the memory of the information processor configured to be executed by the central processing unit, the program configured to divide the image into a first, a second, a third, and a fourth row region of interest, the program configured to determine the location and orientation of a row through each region of interest.

Another embodiment of the invention relates to a method of sensing crop rows in an agricultural field. The method includes sensing electromagnetic radiation with an electromagnetic sensor. The method also includes communicating a digital signal representative of the sensed electromagnetic radiation, and representative of pixels of an image, to a processing device. Further, the method includes dividing the image into a first, a second, a third, and a fourth region of interest and determining the location and orientation of a row through each region of interest.

Yet another embodiment of the invention relates to an agricultural vehicle configured to be guided through a field by an automatic guidance system, the agricultural vehicle includes a visual means for gathering visual input about crop rows in an agricultural field in the format of a digitized image, including pixel information. The vehicle also includes a processing means for dividing the image into a first, a second, a third, and a fourth region of interest, for determining the location and orientation of a row through each region of interest.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
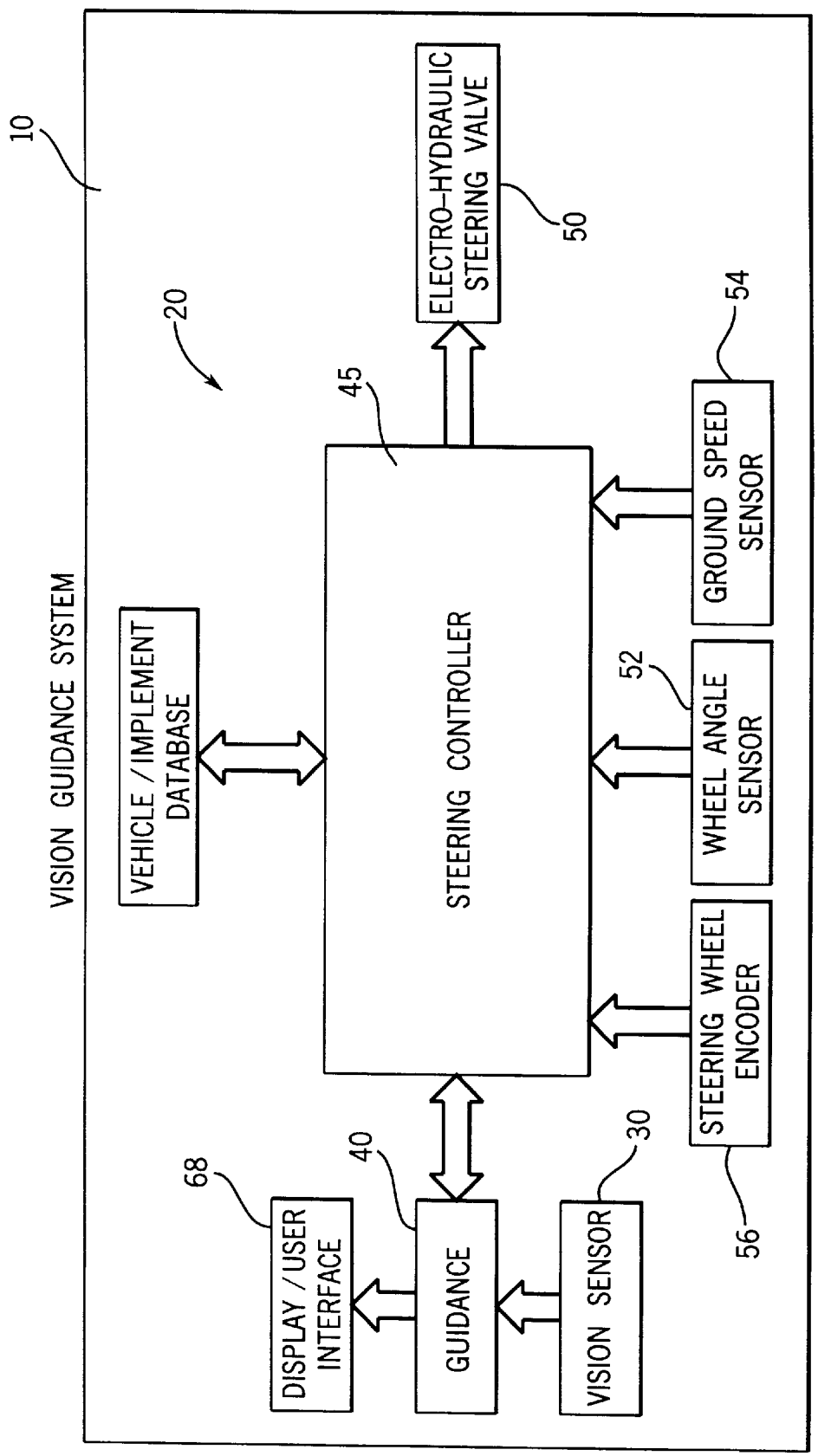
FIG. 1 is a block diagram of an exemplary embodiment of a vehicle having a guidance control system.

Agricultural vehicles such as tractors and combines may be equipped with a guidance system for steering the vehicle through an agricultural field. In some situations, the guidance system must be capable of steering the vehicle in relation to rows of crops (e.g., corn) growing in the field. Referring to FIG. 1, a vision guidance system 20 for an agricultural vehicle 10 (e.g., a tractor or a combine) includes at least one sensor system, for example a vision sensor 30, and a guidance controller 40 for receiving data from the sensor system and generating a desired steering angle therefrom. System 20 may also include a steering controller 45 for generating a steering command for a steering actuator, such as electro-hydraulic steering valve 50, based upon the desired steering angle. Steering controller 45 may be a program running in the memory of an information processing unit, such as a personal computer or other computational device that includes a memory and a central processing unit.

Vision sensor 30 may include, but is not limited to a monochrome charge coupled device (CCD) camera. In a preferred embodiment, the video camera may be a monochrome band pass filtered near infrared (NIR) CCD camera, such as those available from Marshall Electronics of Culver City, Calif. Such a camera may include 256 monochrome gray levels and include 510×492 pixel resolution. Further, such cameras are capable of sensing electromagnetic radiation substantially within the near infrared (NIR) spectrum. Alternatively, cameras including other resolutions and numbers of grayer levels may be used. Further, color cameras may also be used. In a preferred embodiment, the camera may include an automatic electronic iris and may be powered by 12 volts DC at a current of 100 milliamps with a power consumption of 1.2 watts.

Sensor system 20 may also include a mechanical sensor system (for example, a mechanical wand to sense crop rows) and/or a global positioning system (for example, using a differential global positioning system (DGPS) or a carrier-phase differential global positioning system (CDGPS) receiver to sense position). System 20 may include the use of multiple sensor systems to provide robustness by receiving, comparing, processing and/or utilizing in a control algorithm, multiple sensor signals, such a system may be referred to as a "sensor fusion" system (see FIG. 2).

Referring again to FIG. 1, steering controller 45 also receives input signals from a wheel angle sensor 52 and a ground speed sensor 54. Wheel angle sensor 52 may be mounted and aligned over the top of the king pin (the swivel joint that the steering turns on). In a preferred embodiment, the wheel angle sensor may be a 1 K rotary potentiometer aligned with the king pin on the right wheel. The wheel angle sensor may be calibrated for left and right wheels or may be calibrated for non-linearities. Alternatively, the sensor may be mounted on the king pin of the left wheel, a sensor may be mounted on both king pins, or other sensing devices may be utilized to sense wheel angle.

The steering actuator includes an electro-hydraulic valve 50 coupled to a steering cylinder. Steering valve 50 may be, in a preferred embodiment, an electro-hydraulic valve available from Eaton Corporation of Milwaukee, Wis. The valve is used to control the flow of fluid to a steering cylinder. The valve preferably has a capacity of seven gallons per minute and requires 0.62 to 0.65 amps to open the valve. The valve may be controlled with 100 hertz pulse width modulated (PWM) frequency with approximately 10% hysteresis. A steering wheel encoder 56 determines the control signal to be sent to electro-hydraulic steering valve 50 based on the steering command received from the vehicle operator through a control device such as a steering wheel, when the vehicle is being controlled in a manual mode. Steering wheel encoder 56 may also be used to detect steering wheel motion. When motion is present, guidance system 21 may be disengaged to manual mode.

Figure 2:
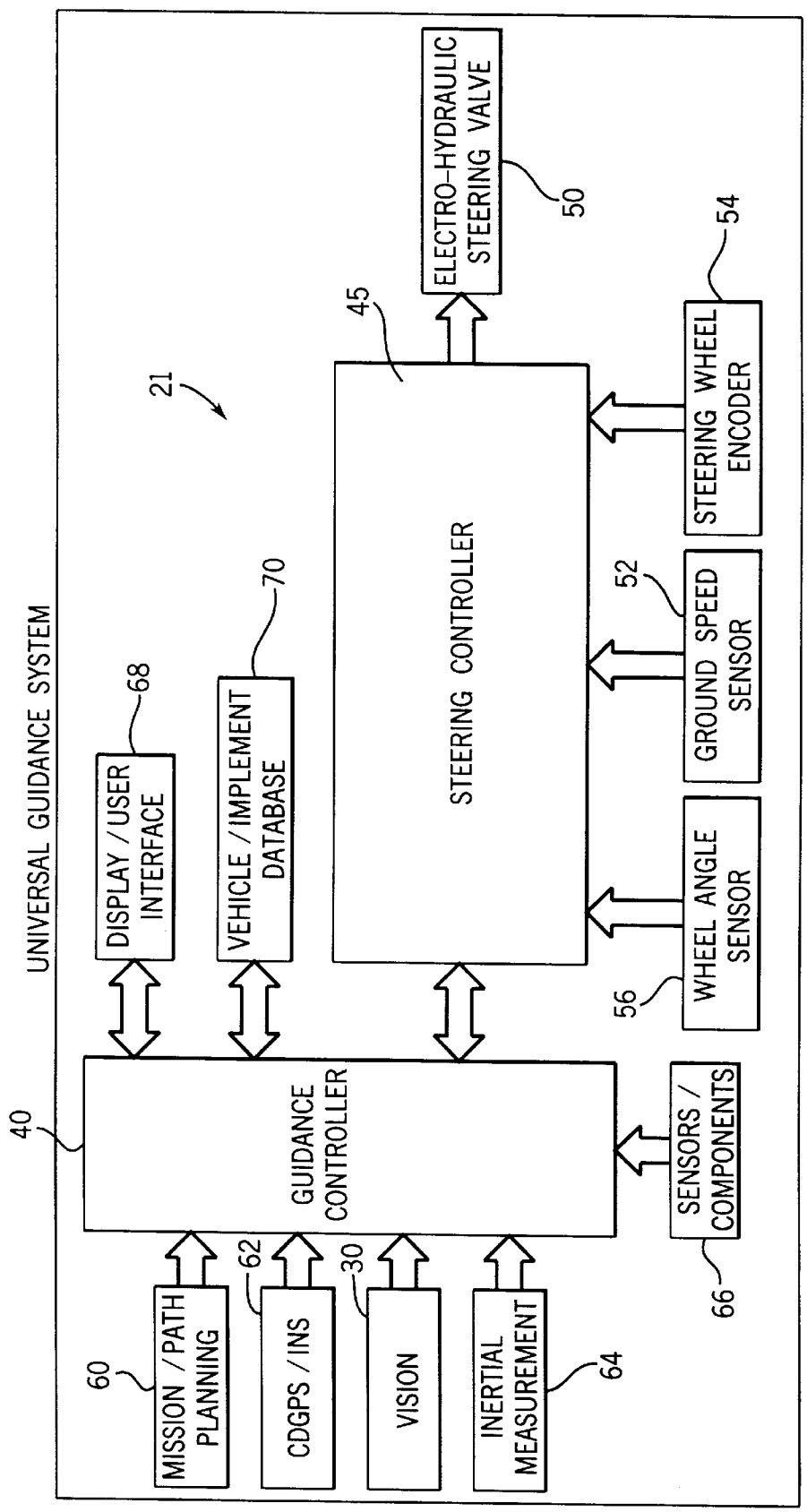
FIG. 2 is a block diagram of a sensor fusion vehicle guidance system.

Referring now to FIG. 2, a sensor fusion universal guidance system 21 for an agricultural vehicle is depicted.

Guidance system 21 includes a guidance controller 40 and a steering controller 45. Guidance controller 40 receives information from a mission or path planning subsystem 60, a CDGPS/inertial navigation system (INS) 62 for providing positional and orientational measurements in the farm field, a vision sensor 30 and an inertial measurement system 64 used for providing orientation of the vehicle in the farm field. Guidance controller 40 also receives inputs from sensors or components 66 that are used to detect conditions which may be hazardous to the guidance system 21, hazardous to vehicle 10, or when the vehicle may be hazardous to the surrounding environment. Sensor fusion universal guidance system 21 is similar to guidance system 20 except that guidance system 21 utilizes guidance controller 40 to bring together measurement signals from a plurality of sensors.

Guidance controller 40 is also in communication with a display or user interface 68 providing output data to the driver and further providing an interface for receiving input from the user. Such a display 68 may be, but is not limited to, a CRT or LCD display inside the driver cabin of agricultural vehicle 10. In a preferred embodiment, the display and master controller may be an LCD display having a screen of 10.4 inches diagonal and a resolution of 640×480 pixels. The master controller may be run on a Pentium® 5 166 megahertz ruggedized computer powered by 12 volts DC and further may include an image capture board used to digitize images and input/output boards installed in the computer itself. Alternatively, other computer and display configurations may be used.

Guidance controller 40 also is in communication with a vehicle implement database 70 which provides information about the vehicle and implements attached thereto. Further, vehicle implement database 70 may store information relating to the particular vehicle and the vehicle use history or any other information that may be accessed at a later time.

Figure 3:
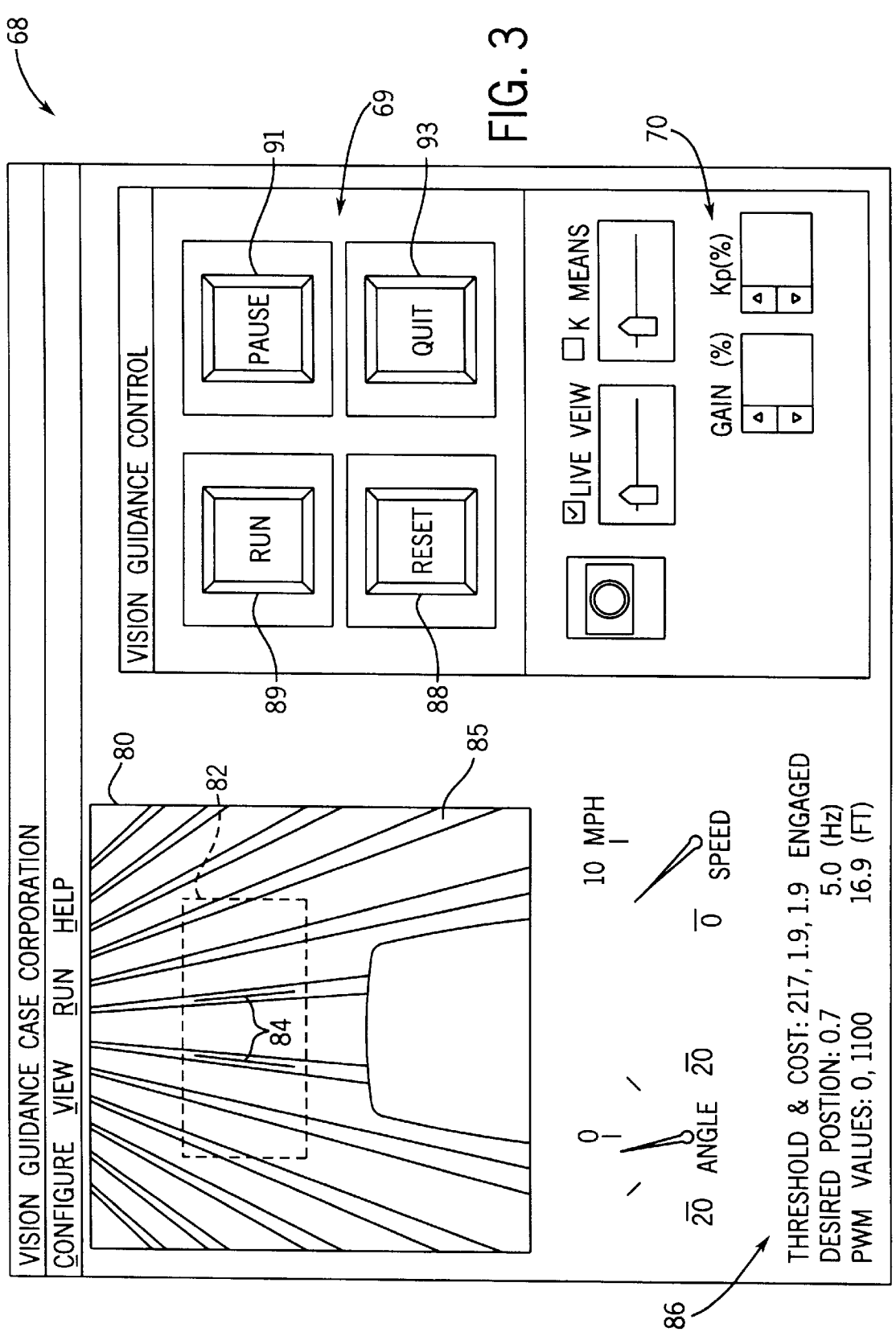
FIG. 3 is an exemplary representation of a vision guidance system graphical user interface.

Referring now to FIG. 3, a display/graphical user interface (GUI) 68 is depicted. In a preferred embodiment, display 68 may be a touch screen having a plurality of buttons 69 and switches 70. The state of buttons 69 and switches 70 may be changed by touching display screen 68. Alternatively, display screen 68 may utilize a mouse pointer or light pen or any other interfacing switches, buttons, or input devices. Display area 68 also includes a video display 80 showing the crop field and further showing a region of interest 82. Region of interest 82 is the area in which image processing takes place. The regions of interest also show two row regions of interest 84. The row regions of interest are used to indicate the approximate orientation of the crop rows being identified by the vision guidance system represented by crop row center lines 85. Display 68 may also include a data area 86 which may have a plurality of readouts relating to the status of the vehicle, including but not limited to gauges and numerical readouts.

Display 68 may run on a Windows® 95 operating system available from Microsoft Corporation of Redmond, Wash., or any other applicable system, especially systems which are adapted for graphical user interfaces (GUI) (such as Linux, etc.), as shown. A reset button 88 is used to reinitialize the image processing routine. A run button 89 causes the image processing routine to begin running. A pause button 91 causes control returned to the operator temporarily. A quit button 93 causes the image processing routine to cease and control of the vehicle returned to the operator for manual operation.

Video display 80 displays the image sensed by a near infrared (NIR) CCD camera mounted to the vehicle. The main region of interest 82 is moved vertically, relative to the display, to maintain processing within a region located at a desired look-ahead distance in front of the vehicle. During processing the positions of the row regions of interest 84 are adjusted horizontally and orientationally to follow the crop rows. Normally, the position of each row region of interest is adjusted independently of the other. Vision guidance system 20 processes the image data located in the row regions of interest 84 to determine locations of rows of crop, with the centroid location and orientation of each row 85 used to determine the desired steering angle ($\gamma_d$). In an alternative embodiment, vision guidance system 20 may also include a CDGPS/INS sensor system 62 or other sensors to form a sensor fusion guidance system providing robustness for the system.

Row Segmentation by K-means Clustering

Images are continuously taken by a monochrome CCD camera 30 which includes a multi-dimensional array of pixels and a NIR filter. Each pixel is encoded as a digital gray level (GL) having a value between 0 and 255 (i.e., in a preferred embodiment each pixel has a depth of eight bits). In a preferred embodiment, the brightest pixels in the image shown in video display 80 of FIG. 3 (i.e., those pixels with the higher gray level values), represent locations of the crop in the field, while the darker pixels (i.e., those pixels with lower gray level values) represent locations of soil.

Figure 4:
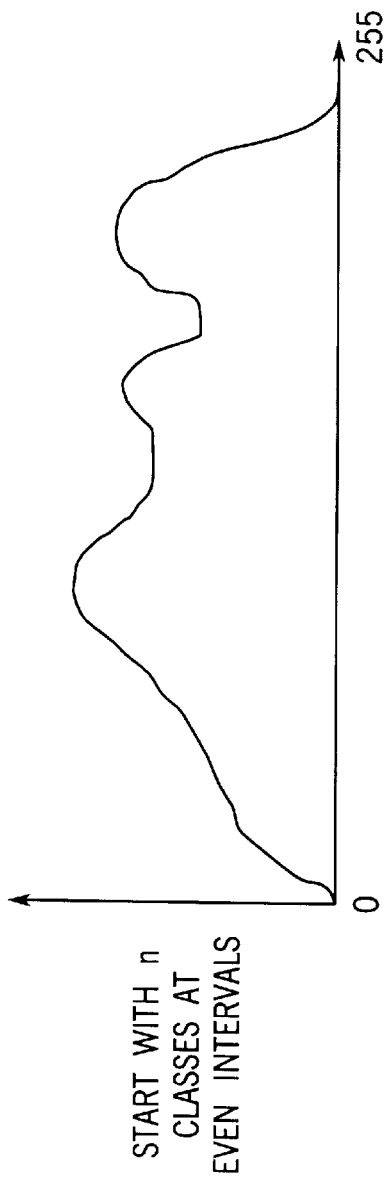
FIG. 4 is a depiction of a histogram showing the initial class intervals for the pixel gray levels.
Figure 5:
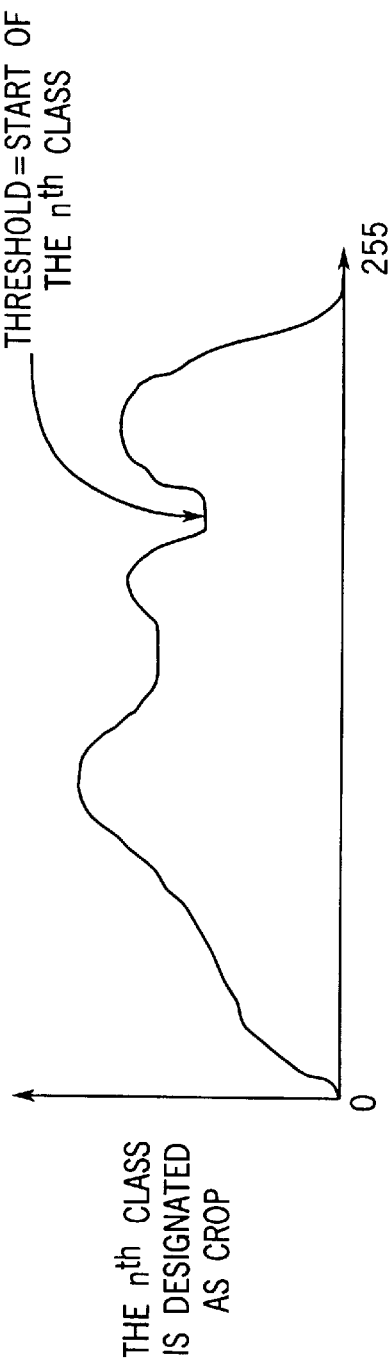
FIG. 5 is a depiction of a histogram during or after K-means clustering showing the gray level classes.

Referring now to FIGS. 4 and 5, row segmentation by K-means clustering is utilized to construct a histogram of the pixel values, with the x-axis representing gray level values and the y-axis representing the number of pixels at those GL values. Therefore, the pixels which more likely represent the crop or vegetation appear at the histogram's right hand side. Image processing is used to segment the rows of crops from the soil that forms the background of the image, by using the K-means clustering algorithm.

K-means is a conventional algorithm to compute a non-hierarchical clustering by minimizing the within-group variance. K-means clustering is a partitioning method for grouping objects. The user of a K-means clustering algorithm decides how many groups, K, is desired. The objective of the K-means clustering algorithm is to minimize the distance from any point (an example) to its nearest center (a prototype point) the general algorithm is as follows:

1. Initialize the centers (random points, or near dense collections of points, etc.)
2. Assign each point to its closest center (based on Euclidean distance in the feature (GL) space)
3. Move each center to the mean (centroid) of the points that are assigned to it.
4. Repeat from 2 if any center has moved or if a threshold of movement has not been obtained.

Referring again to FIGS. 4 and 5, a K-means clustering algorithm divides the histogram produced from the CCD camera image into a predetermined number of classes (i.e., K classes). The intervals for each class are initially evenly spaced (e.g., with six classes, the intervals are evenly spaced apart (see FIG. 4) by (maximum gray level minus minimum gray level divided by 6, and the class center being the center GL of each class)). The algorithm recursively processes the data to determine the average GL for each class by summing all the GLs with a minimum distance to the class center GL. During and after processing the borders between each class are recursively moved (based upon a predetermined metric or the minimization of a cost function), as shown in FIG. 5, until the change in all the class centers between iterations is less than a given tolerance. The tolerance itself may be defined as a measure of when there is no significant change between the class centers for a single iteration. When this tolerance is reached, the start of the Kth class is defined as the segmentation threshold and those pixels below this threshold represent non-crop, while those pixels above this threshold represent crop. In other words, the Kth class (or those GLs having values in the range of the Kth class) is designated as crop or vegetation. Alternatively, any number of classes may be designated as representing crop.

Thus, row segmentation by K-means clustering is used to segment out the pixels representing rows of crop from pixels representing the background soil. Alternatively, any of a number of clustering algorithms and methodologies may be used to distinguish crop from non-crop. These method include, but are not limited to, partitioning methods, self-organizing maps, and neural and fuzzy logic.

Region of Interest Selection Based on Cost

Figure 6:
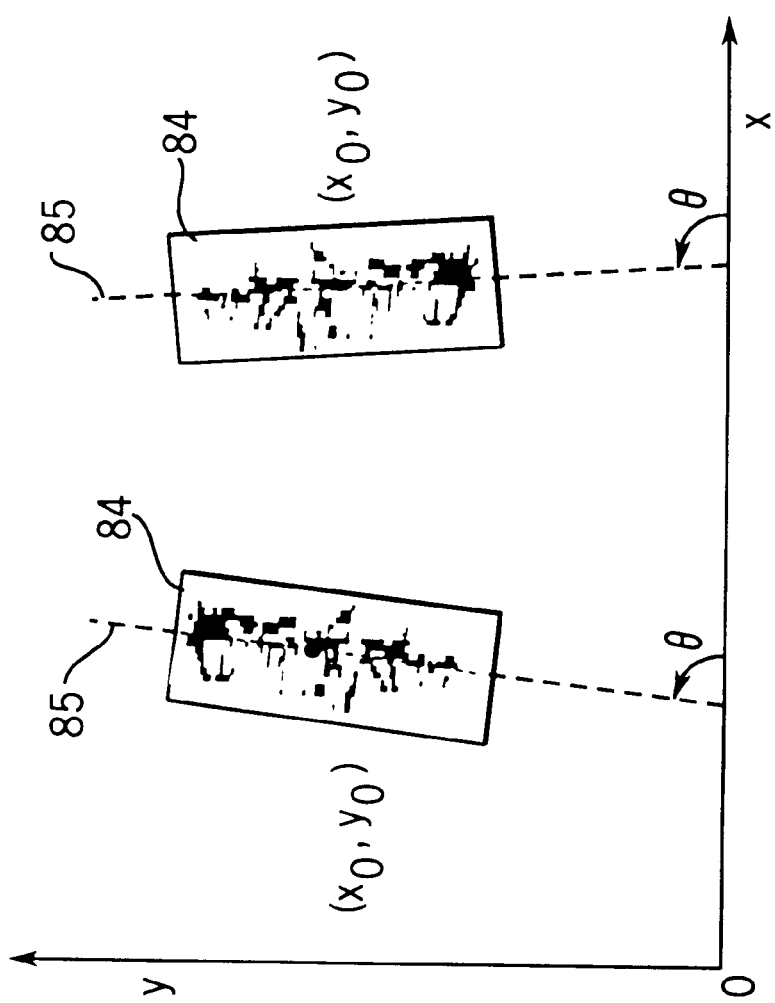
FIG. 6 is a graphical illustration of the main region of interest, showing pixels in each row region of interest.

Once it is determined what gray level values are crop rather than soil, by the K-means clustering algorithm, a desired steering angle can be generated. Referring now to FIG. 6, the image pixels within each row region of interest 84 are segmented by which pixels represent vegetation, using the result of the K-means clustering algorithm. In other words, the crop pixels are identified. Next, moment of inertia image processing algorithms are applied to determine both the location of each row (center point $(x_o, y_o)$), and the orientation of each row 85. Moment algorithms are used generally in image processing to describe the shape characteristics of objects. The location of each row center represented in FIG. 6 by the point $(x_o, y_o)$ within each row region of interest 84 is determined by calculating the centroid of the row region of interest. The orientation of each row, represented in FIG. 6 by the angle θ, between a line representing the center line of the vegetation pixels in each row and the x-axis, is determined by calculating the major and minor axes of each row region of interest 85.

To calculate the location of each center line 85 in row regions of interest 84, moment algorithms are used. For each image a quantity $(x_o, y_o)$ is calculated with $$x_0 = \frac{\sum_i \sum_j x_i a(x_i, y_i)}{\sum_i \sum_j a(x_i, y_i)}$$

$$y_0 = \frac{\sum_i \sum_j y_i a(x_i, y_i)}{\sum_i \sum_j a(x_i, y_i)},$$

where $\alpha(x_i, y_j)$ is the class (or value representative of a class) in which pixel $(x_i, y_j)$ is categorized by the K-means clustering algorithm.

The angle θ of the line intersecting the centroid point $(x_o, y_o)$ may be calculated as follows, by solving for θ in the equation $$\tan^2\theta + \frac{\tan\theta(M_{20} - M_{02})}{M_{11}} - 1 = 0$$

using the standard quadratic formula and taking the inverse tangent thereof, where, $$M_{02} = \sum_i \sum_j (y_j - y_0)^2 a(x_i, y_j),$$

$$M_{20} = \sum_i \sum_j (x_i - x_0)^2 a(x_i, y_j), \text{ and}$$

$$M_{11} = \sum_i \sum_j (x_i - x_0)(y_j - y_0) a(x_i, y_j).$$

The quality of row detection is measured by calculating a cost function. In a preferred embodiment, the cost function utilized may be the root means square (RMS) of the normal distance from each row pixel to the major axis (i.e., the center or dashed line 85). Correspondingly, a high cost represents a poor quality crop row that has been detected, i.e., where the row pixels are widely distributed. A low cost represents a detected crop row of good quality, i.e., where the row pixels are concentrated around the major axis.

During processing, the center lines 85 in the row region of interests 84 are determined by the position and orientation of the detected row in the previous iteration. Normally, when the costs for both row region of interests are low, the position and orientation of each row region of interest are adjusted independently to follow the rows of crop. However, when the cost of either row region of interest 84 exceeds a predetermined threshold (e.g., ten), the pixel data for that row region of interest 84 is deemed to be too inaccurate for use in guidance. Thus, vision guidance system 20 (or 21) includes selection logic which selects which row region of interest 84 can be used for guidance based upon the cost function. When the cost of both row region of interests exceeds the cost threshold (e.g., both costs greater than ten), vision guidance system 20 is automatically disengaged and the system resorts to manual steering control. However, when the cost of only one row region of interest 84 exceeds the threshold, the location and orientation of the row region of interest 84 with lowest cost is used. In other words, the position of the erroneous row region of interest is adjusted horizontally to follow the rows of crop dependent upon the position of the acceptable row region of interest 84 data.

Trajectory Path Planner

Figure 7:
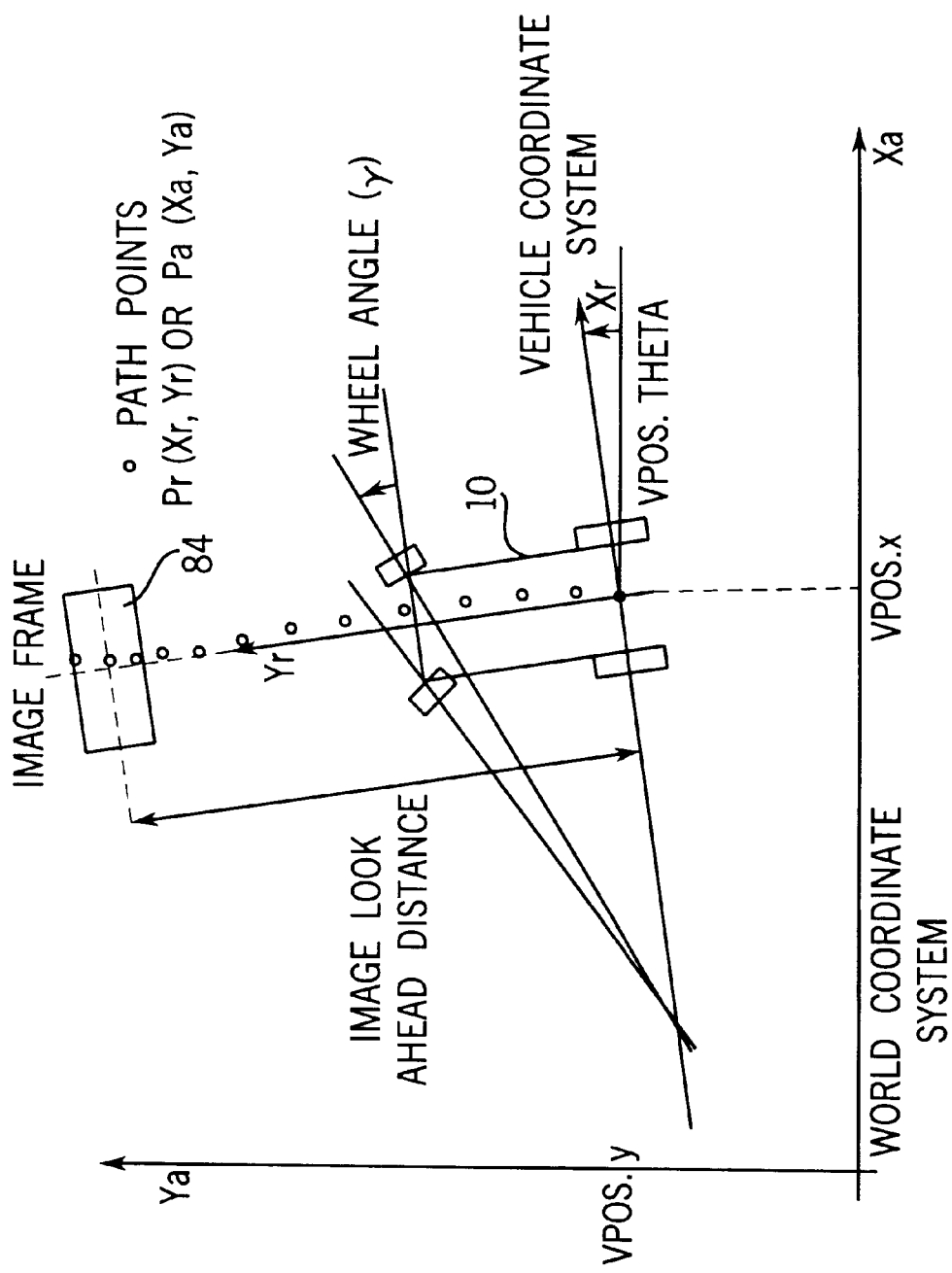
FIG. 7 is a diagram depicting the trajectory path planning frames of reference.

Referring now to FIG. 7, vision guidance system 20 executes a trajectory path planner algorithm. The purpose of the trajectory path planner algorithm is to determine steering corrections for vehicle 10 based upon information provided by the image processing algorithms, such as the vehicle heading and offset errors from the crop rows. The output of the algorithm is desired wheel angle $\gamma_d$, as described above. The sensed image is segmented to determine the points defining crop row centers for each image. The trajectory path planner samples the crop row center points n times to form a matrix of $[x,y]_I$ locations representing a trajectory in the image space.

$$[x, y]_I = \begin{bmatrix} x_1 & y_1 \\ x_2 & y_2 \\ \vdots & \vdots \\ x_n & y_n \end{bmatrix}$$

Row center points are transformed to vehicle space using an image-to-vehicle coordinate transformation matrix ($T_c$).

$$[x,y]_T = T_c[x,y]_I$$

In the vehicle space, the origin is defined as a point located at the center of the rear axle. The x-axis defines the vehicle's lateral direction.

The trajectory path planner operates in either of two modes, a startup mode and a run mode. The startup mode occurs after initial engagement of the guidance system where the planner must estimate the first few steering corrections. The run mode occurs after the vehicle has traveled a sufficient distance such that the trajectory matrix is filled and the trajectory runs through the origin with minimal errors.

Startup Mode

The trajectory planning system must estimate the first steering corrections during startup mode by computing a steering correction for a straight path to the first trajectory point determined in the image $(x_1, y_1)$. This initial estimation is done using the following steps.

1. Determine $(\Delta x, \Delta y)$:

$$\Delta x = x_1 - x_0$$

$$\Delta y = y_1 - y_0$$

2. Calculate the required turning radius (R) for the tractor to pass through the point $(x_1, y_1)$:

$$R = \frac{\Delta x^2 + \Delta y^2}{2\Delta x}$$

3. Calculate the desired steering angle, $\gamma_d$ for the turning radius, R:

$$R = \left(\frac{L}{\sin(\gamma_d)}\right) + OS - \frac{1}{2}TW$$

the desired steering angle $(\gamma_d)$, $$\gamma_d = \sin^{-1}\left(\frac{L}{R + \frac{1}{2}TW + OS}\right), \text{ where}$$

L is the length of the tractor wheel base, OS is the distance from the steered tire center to the pivot center (king pin), and TW is the tire width.

As the vehicle moves toward the desired path, $[x,y]_t$ is updated with the new trajectory points determined from the image.

Run Mode

Three subroutines may be utilized by the trajectory planner in the run mode including:

a. TPlanStart( )—initializes the trajectory matrix, wheel angle, and heading and allocates memory. TplanStart( ) is only utilized before the run loop is started or is restarted.

b. TPlanOutput( )—main routine that determines the planned trajectory path, calculates the desired wheel angle and updates the trajectory path matrix. This routine runs in the run mode loop.

c. TPlanEnd( )—Frees allocated memory and resets the trajectory matrix, wheel angle, and heading. TplanEnd( ) is only instigated when the run mode loop is interrupted or the program is exited.

In a preferred embodiment, a regression method is used to determine the trajectory path by including the points from the processed image and using a linear regression from the last point in the image (a point closest to the vehicle) to the vehicle origin to determine the remaining points that make up the trajectory matrix. In an alternative embodiment, a prediction method may be utilized to determine the desired trajectory path and the desired wheel angles.

Alternatively, in a prediction method, the points from the vehicle origin to the image are predicted using vehicle kinematics. Due to the errors associated with vehicle dynamics, including the steering system and tire slip, using kinematics alone results in excessive errors built up in the trajectory matrix points that are predicted between the vehicle origin and the image. These errors are more significant for points closer to the vehicle origin. However, it is possible to use vehicle kinematics alone, or in a combination with an error estimator to provide accurate prediction.

In a preferred embodiment using the regression method, TPlanOutput( ) requires vehicle speed, measured wheel angle, and the processing frequency. TplanOutput() determines the desired wheel angle, and look-ahead distance. Outside of the trajectory planner, the look-ahead distance is used to determine the vertical position of the main region of interest. Utilization of the regression method does not require updated or changes in vehicle position.

Figure 8:
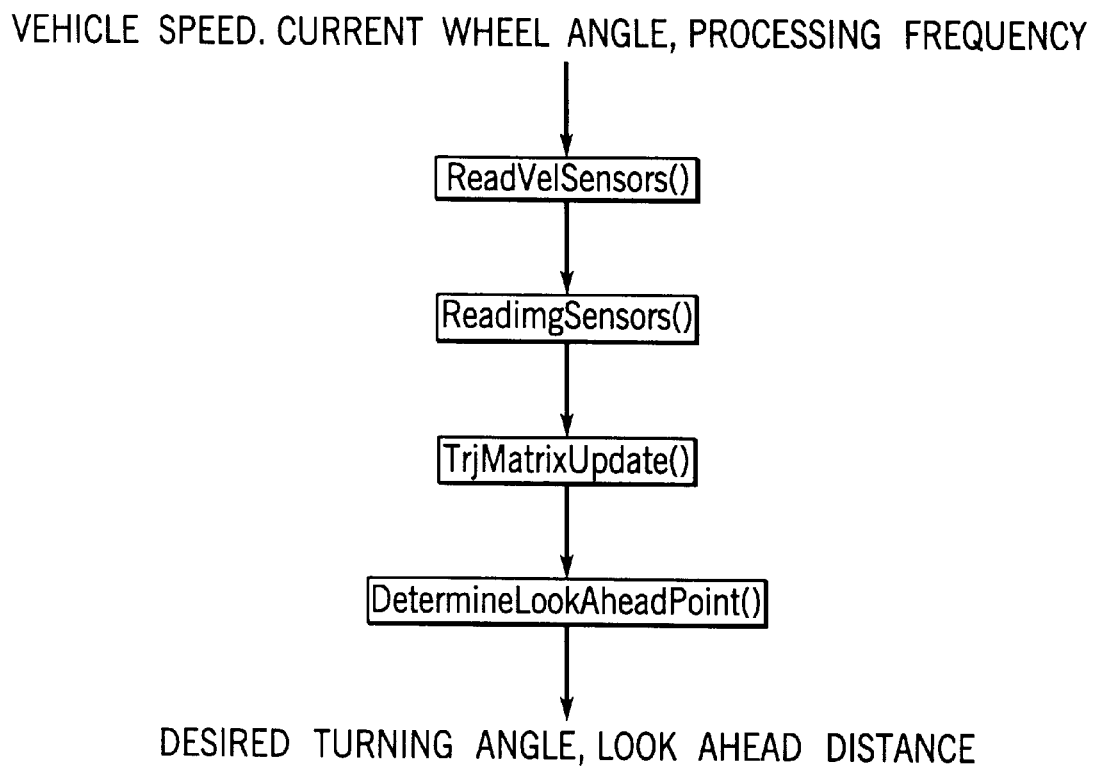
FIG. 8 is a flow diagram for determining desired turning angle and look ahead distance.

Referring now to FIG. 8, a flow diagram for the regression method in TplanOutput( ) is depicted. The ReadVelSensors subroutine initializes the clock to determine the sampling time of the trajectory planner. The ReadImgSensors( ) subroutine sets ImgPts to the number of image points being extracted (currently implemented with five points). ReadImgSensors( ) also transforms image points in image space to vehicle coordinate space and stores the points in Imgcoord[i].x and ImgCoord[i].y. The TrjMatrixUpdate( ) subroutine updates the trajectory matrix and array of (x,y) points in vehicle coordinate space that defines the desired trajectory path. For the regression method TrjMatrixUpdate( ) may include an initialization of the trajectory matrix when needed. The trajectory matrix (TrjMatrix( )=$[x,y]_t$) consists of a discrete number of points. The first five points are extracted from the image. The array is defined so that the first point is the point farthest from the vehicle origin and the last point is the point closest to the origin. The point from the bottom of the image $(x_r, y_r)$, to the origin, (0,0), determines the regression line that defines the remaining path. Points on the regression line are defined as $$TrjMatrix[ImgFPoints-1+i].x = x_r*(1.0 - i*Ddis/dr),$$

$$TrjMatrix[ImgFPoints-1+i].y = y_r*(1.0 - i*Ddis/dr),$$

where ImgFPoints is the number of image points, i is the discrete point on the regression line, Ddis is the discrete distance between each point, and dr is the distance from the origin to the bottom image point. The last point in the trajectory matrix is set to (0,0).

Figure 9:
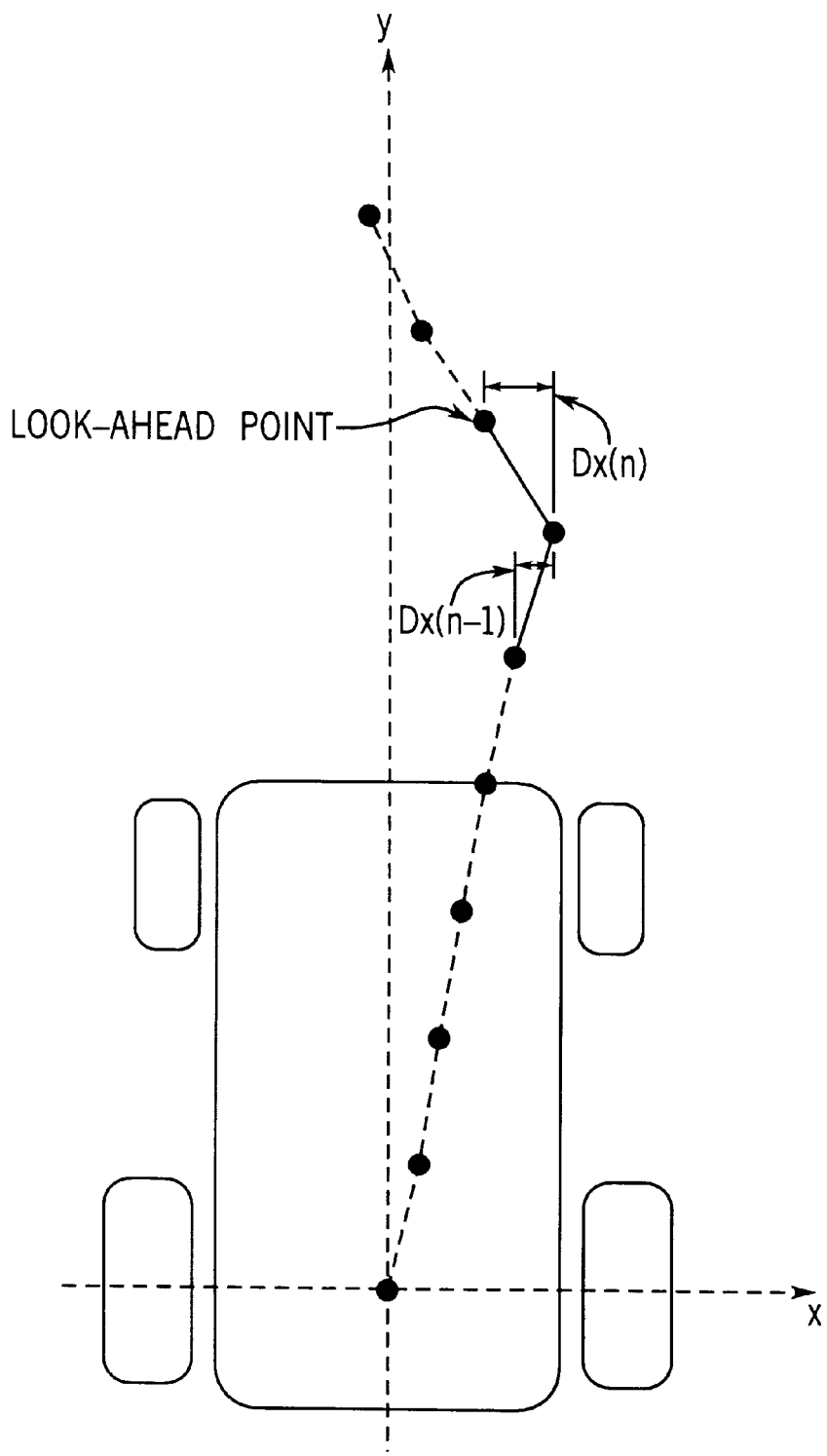
FIG. 9 is a diagrammatic view of the trajectory path planner for a curved path.

After the trajectory matrix is constructed the look-ahead point is a trajectory matrix point that the vehicle will guide toward. The ultimate goal is that the vehicle origin will pass over this point (see FIG. 9). The maximum look-ahead distance DrvLookAheadDis is determined by $$DrvLookAheadDis = DrvLookAheadMinDis + DrvLookAheadTime*(Cv*VelSpeed),$$

where DrvLookAheadMinDis is a fixed minimum distance, DrvLookAheadTime is a fixed look-ahead time, Cv converts miles per hour to feet per second, and VelSpeed is ground speed in miles per hour. To determine the look-ahead point, the algorithm starts from the origin and steps through each point. For each point the difference between the previous point $(\Delta_x, \Delta_y)$ and the accumulated distance to the point from the origin (Sum 1) is determined.

Figure 10:
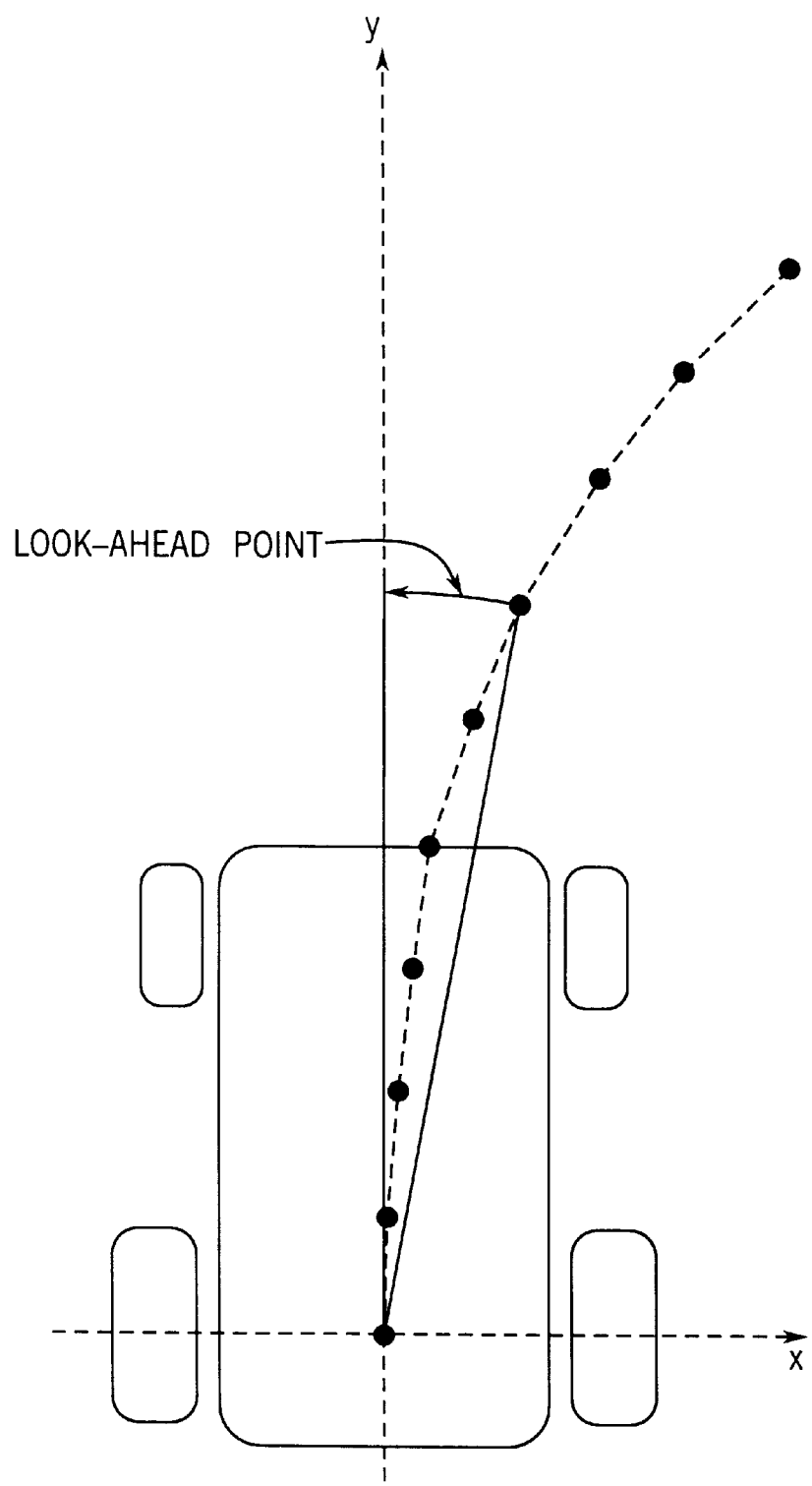
FIG. 10 is a diagrammatic view of the trajectory plan based on a fixed minimum angle.
Figure 11:
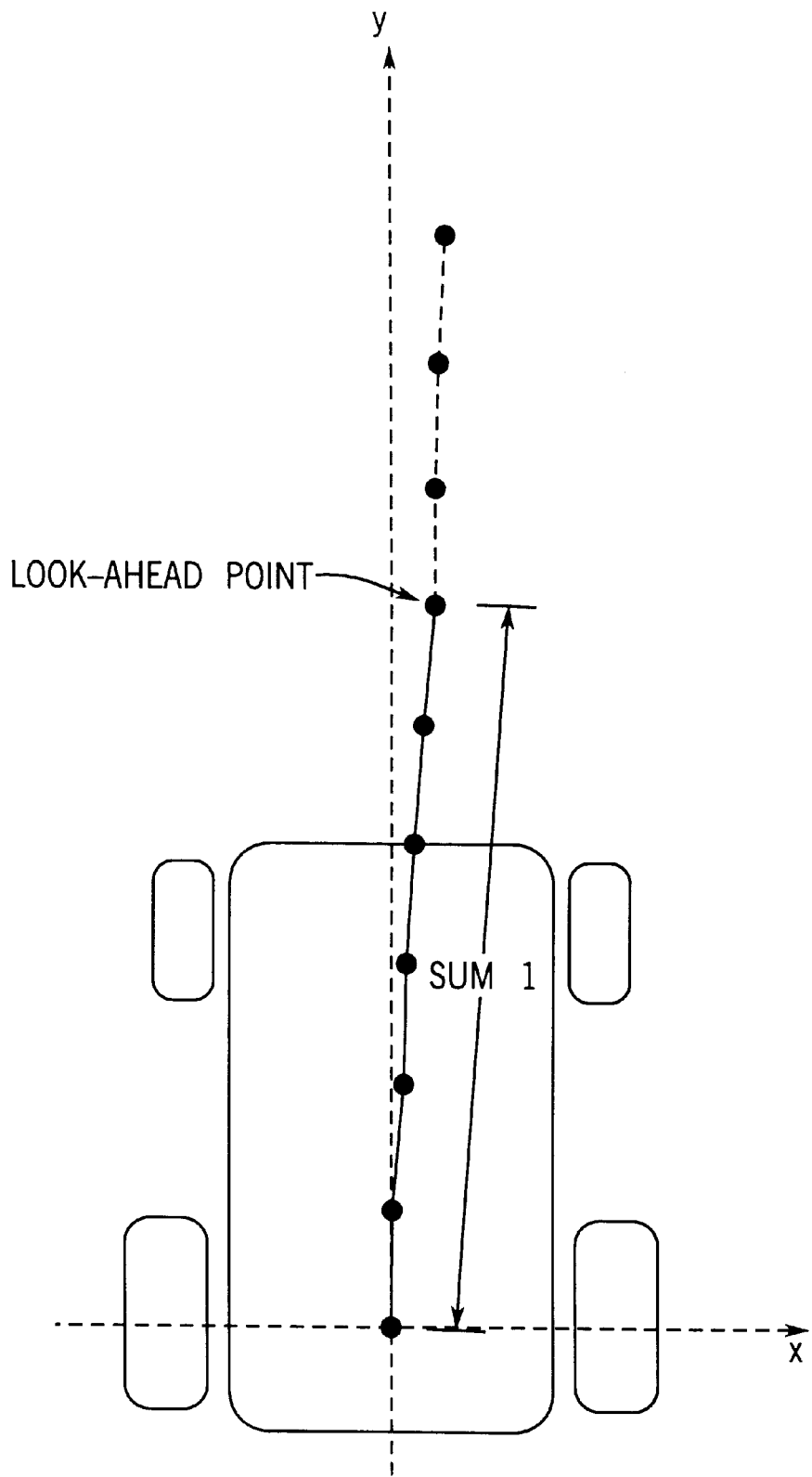
FIG. 11 is a diagrammatic view of a trajectory path plan based on the quantity $SUM_1$.

There are basically three conditions that determine the look-ahead point. Condition no. 1 is based on whether the path curvature changes direction (see FIG. 9) curvature is detected by considering three successive points in determining a change in direction. If $\Delta_x$ is positive and greater than a fixed minimum path deviation (FMinPathDev) then the direction is oriented right. Alternately, if $\Delta_x$ is negative and less than FminPathDev then the direction is oriented left. Otherwise the direction is straight. If the current direction changes from the previous direction then a curve is detected. If a change in direction has occurred and the path distance of the current point is greater than DrvLookAheadMinDis then this is the look-ahead point (see FIG. 9). If condition no. 1 is not met then condition no. 2 considers the path to be curved but does not change directions (see FIG. 10). The look-ahead point is determined when the angle between the current point and the heading exceeds a fixed minimum angle and the path distance to the current point is greater than DrvLookAheadMinDis. Condition no. 3 considers the path is straight ahead of the vehicle. Therefore, the look-ahead point is determined when $Sum_1$ exceeds DrvLookAheadDis. Also if the look-ahead point is beyond the farthest point in the image then this point becomes the look-ahead point (see FIG. 11).

The desired wheel turn angle, $\gamma_d$, is determined by the (x,y) location of the look-ahead point. To determine the desired wheel turn angle $\gamma_d$ first, the required turning radius, TR, is calculated as $$TR = \frac{\Delta_x^2 + \Delta_y^2}{2\Delta_x},$$

since the origin is located at (0,0) then $\Delta_x$ and $\Delta_y$ is the (x,y) location of the look-ahead point. The turn angle, Ta is calculated as:

$$Ta = a\tan\frac{WB}{\sqrt{(TR-OS)^2 - WB^2} - 0.5*PC},$$

where WB is the vehicle wheel base, OS is the measured distance from the king pin axis to the center of the turning wheel, and PC is the distance between the left and right king pins. Turn angle, Ta is the same as the desired turn angle ($\gamma_d$).

Prediction Method

The trajectory planner creates a path from the image frame 84 back to the vehicle origin (i.e., the center of the rear axle), with each point relative to the vehicle coordinate system. However, the system only senses the path points within the image frame, and must estimate the other path points from the bottom of the image frame going all the way back to the vehicle origin by using a linear regression or a vehicle kinematic model. The system determines a look-ahead distance along the y-axis in front of the vehicle origin. This distance depends on both vehicle speed and curvature of travel, and is used to determine which points in the path matrix the vehicle will be guided towards. Once these path points are determined, the system determines the desired wheel angle required such that the vehicle origin will pass through that point, given the vehicle's position relative to that point and the turning radius.

Region of Interest Selections for Varying Distances Between Rows

As discussed above, vision guidance system 20 produces an image of agricultural fields as that shown in video display 80 of FIG. 3. The image processing algorithms of the vision guidance system, discussed above, include a calibration function used to transform the coordinates of a pixel in the image to the coordinates in the vehicle space, and vice versa. In other words, the vision guidance system calibrates the camera to determine image-to-vehicle and vehicle-to-image coordinate transformation matrices for use in transforming pixel coordinates to vehicle coordinates, and also for use in transforming vehicle coordinates to pixel coordinates, respectively.

In certain situations, the vision guidance system uses these coordinate transformation matrices, along with a cost function analysis, to detect errors and to better determine the locations of the row region of interests. It may be known that, in a particular field, rows of crops will be spaced apart by a predetermined distance. For example, rows of corn may have been planted in parallel rows spaced thirty inches apart. Using this knowledge, it is apparent that the distance between centers of the two row region of interests in an image should also be thirty inches apart in vehicle space. Thus, the vision guidance system determines the location of the centers of the two row region of interests, performs image-to-vehicle transformations to determine the locations of the two row region of interests in vehicle space, and then determines whether the two row region of interests are spaced apart by the predetermined distance in vehicle space (within an allowable error band). If not, an error is flagged, and the vision guidance system selects the row region of interest having the lower cost, and adjusts the position of the row region of interest having the higher cost such that it is separated from the lower cost row region of interest by the predetermined separation distance.

Improved Tracking

Figure 12:
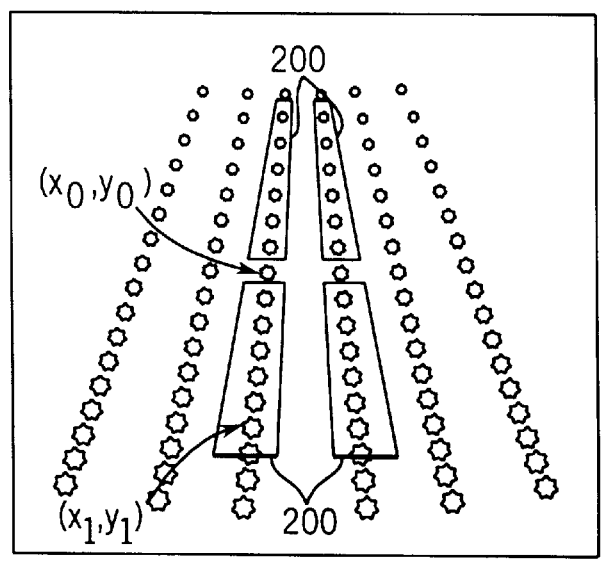
FIG. 12 is a diagram of the four row regions of interest viewed from the perspective of video display 80.
Figure 13:
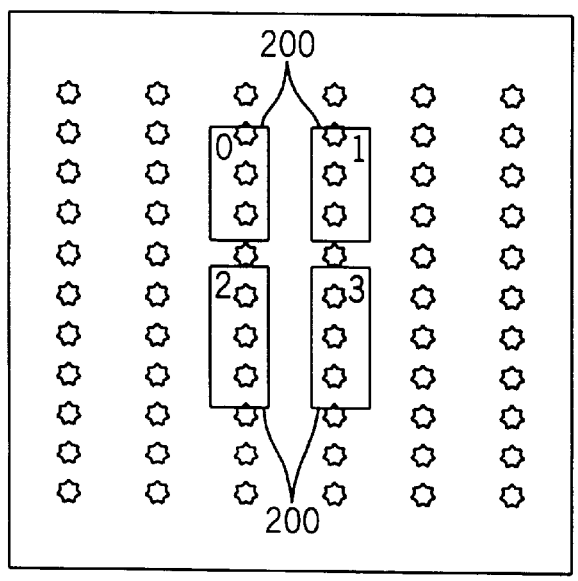
FIG. 13 is a diagrammatic view of the relative positions of the four row regions of interest relative to the crop rows and relative to each other.

In a preferred embodiment, the method and apparatus described above may use four row regions of interest 200 (see FIGS. 12 and 13. The four row regions of interest 200 are used to follow two crop rows during guidance, redundantly. The image processing algorithm may generate the four row region of interests 200 recursively using the row position that is determined in each iteration. By using the image-to-vehicle coordinate transformation, pixels in the image are mapped to points in the vehicle space uniquely with its origin at the center of the rear axle. Referring now to FIG. 13, the relative positions of the four row regions of interest in the vehicle space are depicted. All four row regions of interest 200 may be used to determine the steering correction. If it is known that the crop rows in the vehicle space should all have a fixed average distance that is predetermined by planting (e.g., 30 inch crop rows), that information may be used by the guidance algorithm. The guidance algorithm uses row regions of interest 200 by updating the relative positions and checking to make sure that they are on the right rows and that the vehicle should follow.

Figure 14:
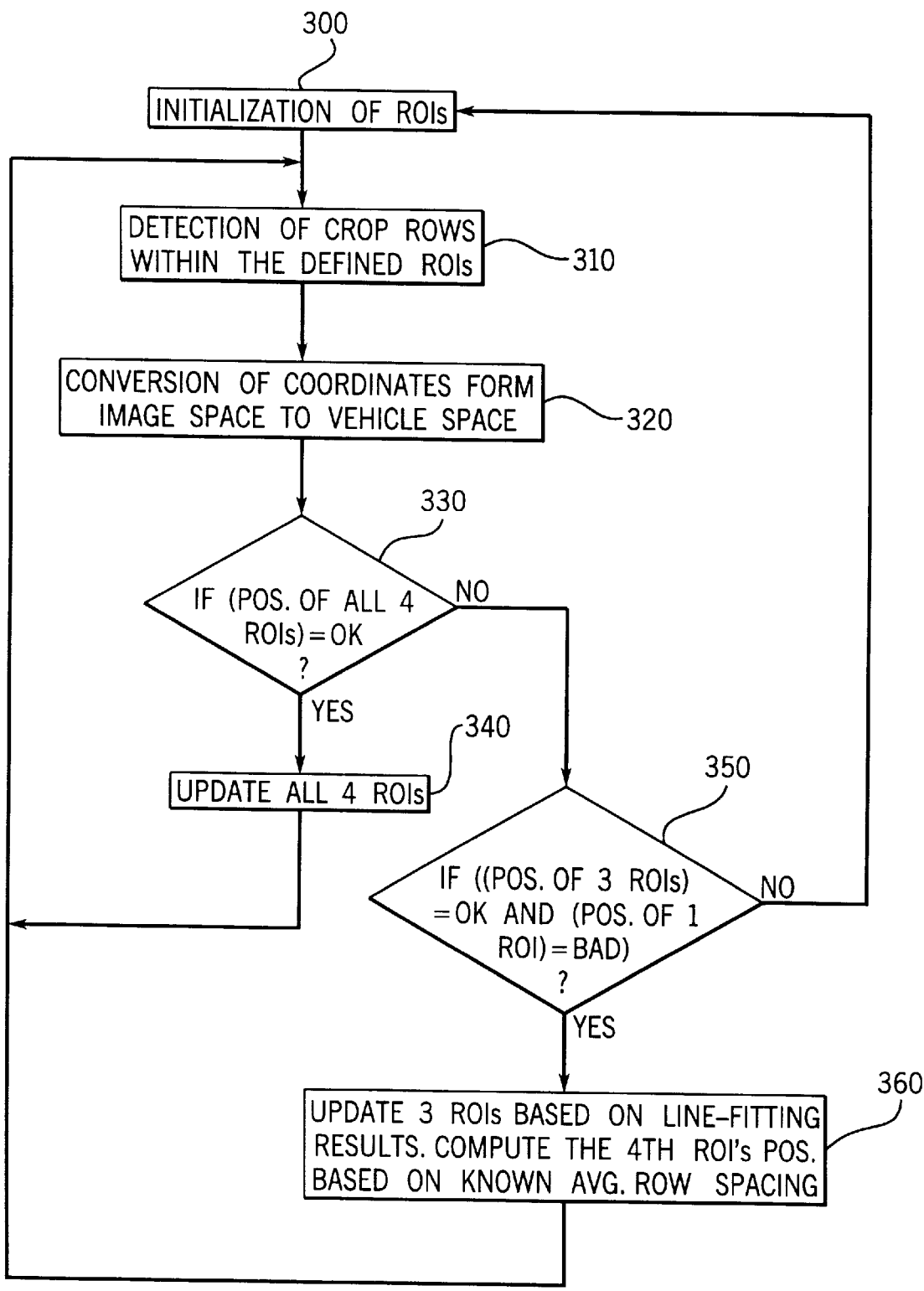
FIG. 14 is a flowchart depicting the logic used when utilizing four row regions of interest.

FIG. 14 depicts a flow chart of the logic for using four row regions of interest 200 for row tracking in the vision guidance system 20. Initially the row regions of interest are initialized in step 300. The crops are detected within the defined row regions of interest 200 in step 310, the conversions of coordinates from image space to vehicle space are provided in step 320. Step 330 queries as to whether the position of all four row regions of interest are okay (i.e., within a predetermined error tolerance) based on the predetermined distances between the rows. If the position of all four row regions of interest are okay, all four row regions of interest are updated independently of each other in step 340. However, if at least one of the four row regions of interest are not okay, step 350 inquires as to whether only one of the row regions of interest is bad. If only one of the row regions of interest are bad, all three of the good row regions of interest are updated based on the line fitting results and a fourth row region of interest position is calculated based on the known average row spacing. If more than one of the row regions of interest 200 are bad (i.e., outside of a predetermined error tolerance), then the row regions of interest are reinitialized in step 300.

While the detailed drawings, specific examples, and particular formulations given describe preferred embodiments, they serve the purpose of illustration only. The materials and configurations shown and described may differ depending on the chosen performance characteristics and physical characteristics of the agricultural vehicle and the electronics associated therewith. For example, the type of computer or microprocessing devices used may differ. The systems shown and described are not limited to the precise details and conditions disclosed, nor to the precise formulations or algorithms described. Furthermore, other substitutions, modifications, changes, and omissions may be made in the design, operating conditions, and arrangement of the preferred embodiments without departing from the spirit of the invention as expressed in the appended claims.

What is claimed is:

1. An automatic guidance system for an agricultural vehicle, the guidance system comprising:

an electromagnetic sensor for gathering information about field characteristics, the electromagnetic sensor configured to provide a signal representative of crop rows in an agricultural field, the signal represented as pixels of an image;

an information processor having a memory and a central processing unit, and the information processor coupled to the electromagnetic sensor; and a program in the memory of the information processor configured to be executed by the central processing unit, the program configured to divide the image into a first, a second, a third, and a fourth row region of interest, the program configured to determine location and orientation of a row through each region of interest, wherein the program is configured to determine whether all the rows are substantially representative of the location and orientation of the crop rows.

2. The guidance system of claim 1, wherein the program is configured to divide the image into more than four row regions of interest.

3. The guidance system of claim 1, wherein the program is configured to compute the location and orientation of at least one row based on a predetermined row spacing.

4. The guidance system of claim 1, wherein the program is configured to reinitialize the row regions of interest when a predetermined number of rows are not substantially representative of the crop rows.

5. The guidance system of claim 1, wherein the location and orientation of the first and second row are determined by a moment algorithm.

6. An automatic guidance system for an agricultural vehicle, the guidance system comprising:

an electromagnetic sensor for gathering information about field characteristics, the electromagnetic sensor configured to provide a signal representative of crop rows in an agricultural field, the signal represented as pixels of an image;

an information processor having a memory and a central processing unit, and the information processor coupled to the electromagnetic sensor; and a program in the memory of the information processor configured to be executed by the central processing unit, the program configured to divide the image into a first, a second, a third, and a fourth row region of interest, the program configured to determine location and orientation of a row through each region of interest, wherein the program is configured to determine whether at least three of the rows are substantially representative of the location and orientation of the crop rows.

7. A method of sensing crop rows in an agricultural field, comprising:

sensing electromagnetic radiation with an electromagnetic sensor;

communicating a digital signal representative of the sensed electromagnetic radiation, and representative of pixels of an image, to a processing device;

dividing the image into a first, a second, a third, and a fourth region of interest;

determining location and orientation of a row through each region of interest; and determining whether all the rows are substantially representative of the location and orientation of the crop rows.

8. The method of claim 7, further comprising:

dividing the image into more than four row regions of interest.

9. The method of claim 7, further comprising:

computing the location and orientation of at least one row based on a predetermined row spacing.

10. The method of claim 7, further comprising:

reinitializing the row regions of interest when a predetermined number of rows are not substantially representative of the crop rows.

11. The method of claim 7, wherein the location and orientation of the first and second row are determined by a moment algorithm.

12. A method of sensing crop rows in an agricultural field, comprising:

sensing electromagnetic radiation with an electromagnetic sensor;

communicating a digital signal representative of the sensed electromagnetic radiation, and representative of pixels of an image, to a processing device;

dividing the image into a first, a second, a third, and a fourth region of interest;

determining location and orientation of a row through each region of interest; and determining whether at least three of the rows are substantially representative of the location and orientation of the crop rows.

13. An agricultural vehicle configured to be guided through a field by an automatic guidance system, the agricultural vehicle comprising:

a visual means for gathering visual input about crop rows in an agricultural field in the format of a digitized image, including pixel information; and a processing means for dividing the image into a first, a second, a third, and a fourth region of interest, for determining the location and orientation of a row through each region of interest, wherein the processing means is configured to determine whether all the rows are substantially representative of location and orientation of the crop rows.

14. The agricultural vehicle of claim 13, wherein the processing means is configured to determine whether at least three of the rows are substantially representative of the location and orientation of the crop rows.

15. The agricultural vehicle of claim 13, wherein the processing means is configured to divide the image into more than four regions of interest.

16. The agricultural vehicle of claim 13, further comprising:

a control means for controlling the direction of movement of the agricultural vehicle based upon the location and orientation of the rows.

17. The agricultural vehicle of claim 13, wherein the processing means is configured to compute the location and orientation of at least one row based on a predetermined row spacing.

* * * * *